(12) United States Patent
Bova

(10) Patent No.: US 6,443,367 B1
(45) Date of Patent: Sep. 3, 2002

(54) DEEPWATERING DEVICE

(76) Inventor: Joseph Bova, 840 E. Jefferson St., Stockton, CA (US) 95267

(*) Notice: Subject to any disclaimer, the term of this patent is extended or adjusted under 35 U.S.C. 154(b) by 0 days.

(21) Appl. No.: 09/659,138

(22) Filed: Sep. 11, 2000

(51) Int. Cl.$^7$ .............................................. B05B 15/06
(52) U.S. Cl. ...................................................... 239/276
(58) Field of Search ................................ 239/273, 276, 239/280, 532; 47/48.5, 57.5

(56) References Cited

U.S. PATENT DOCUMENTS

| | | |
|---|---|---|
| 2,315,225 A | 3/1943 | Rogers |
| 2,790,403 A | 4/1957 | Larsen |
| 2,795,437 A | 6/1957 | Mueller |
| 2,805,088 A | 9/1957 | Cline et al. |
| 3,023,971 A * | 3/1962 | Milhous |
| 3,144,211 A * | 8/1964 | Goldman |
| 4,170,948 A * | 10/1979 | Strickland, Jr. .......... 47/48.5 X |
| 4,254,717 A | 3/1981 | Miller |
| 4,726,143 A | 2/1988 | Steinbeck |
| 5,340,162 A | 8/1994 | Prendei et al. |
| 5,618,000 A | 4/1997 | Lantzy et al. |
| 6,241,163 B1 * | 6/2001 | Bremer ..................... 239/276 |

* cited by examiner

Primary Examiner—Lesley D. Morris
(74) Attorney, Agent, or Firm—Theodore J. Bielen, Jr.

(57) ABSTRACT

A watering device connectable through a threaded fitting to a source of water. The device includes an elongated conduit having a first portion with an aperture and a second portion with a second aperture. A flange connects to the first portion of the conduit and fits against a lip or ridge of a rotatable member which is passed over the conduit from the second portion to the first portion. The rotatable member includes a threaded surface, which engages the threaded fitting leading to the source of water.

5 Claims, 2 Drawing Sheets

DEEPWATERING DEVICE

BACKGROUND OF THE INVENTION

The present invention relates to a novel and useful watering device.

Deep-rooted plants such as trees, vines, and shrubs, require deep watering. That is to say, water must delivered beneath the surface of the soil to the lower part of the roots of these plants in order to encourage plant growth. In the past irrigators which are capable of delivering water to a root system of a plant have been devised. For example, U.S. Pat. No. 4,726,143 shows a root-fertilizing device which includes provision of cylindrical members into the ground below the surface of the soil.

U.S. Pat. Nos. 2,790,403, 4,254,717, and 5,618,000 show water systems in which water is delivered from a source, typically a garden hose, to an elongated tube which is pushed into the soil adjacent a tree or shrub. Such irrigators usually include a conventional garden hose couplings which have proven to be fragile for such a watering system.

U.S. Pat. Nos. 2,795,437 and 5,340,162 describe removable guidance support sleeves for nuts.

U.S. Pat. Nos. 2,315,225 and 2,805,088 show hose couplings which employ threaded fittings and nipples that are useable to permit connection of hoses to other water carrying devices.

A deep watering device which is durable and reliable would be a notable advance in the field of irrigation systems.

BRIEF SUMMARY OF THE INVENTION

In accordance with the present invention a novel and useful deep watering device is herein provided.

The device of the present invention utilizes an elongated conduit possessing a first portion having a first aperture and a second portion having a second aperture. Of course, the elongated conduit is formed continuously to connect the first and second aperture to one another to allow fluid, such as water, to flow within the conduit between the first and second portions. The conduit may be a metallic member and formed, in one embodiment, such that the first and second portions are angularly connected to one another.

A flange is connected to the first portion of the elongated conduit. Such connection may take place at the terminus of the first portion. The flange may be welded, glued, formed integrally, and connected in any conventional way. The flange may be formed as part of a nipple which includes a bore. The nipple is sized to fit within the first portion of the elongated conduit such that the flange connected to the nipple extends outside the first portion of the conduit and extends outwardly from the outer surface of the conduit.

A rotatable member having a bore is also provided in the present device. The rotatable member fits over the elongated conduit second portion and may be slipped to the first end portion of the conduit. At that point, the rotatable member lies adjacent the flange. The rotatable member further includes a lip or ridge which is capable of engaging the flange to prevent further movement of the rotatable member along the elongated conduit. The rotatable member includes a threaded portion, typically a female threaded portion, which is capable of engaging the threaded fitting, typically a male threaded fitting leading to the source of water. When this connection is made, flows from the source of water through the conduit and into the ground adjacent the plant root system.

A washer may also be employed between the flange and the rotatable member lip. The washer may be constructed of any suitable material such as elastomeric compositions.

To permit the second portion of the elongated conduit to penetrate the ground easily, the peculiar tip may be formed into the end of the second portion of the elongated conduit. For example, a conical end may be formed at this place to aid the user in pushing the second portion of the conduit into the ground.

It may be apparent that a novel and useful watering device has been described.

It is therefore an object of the present invention to provide a deep watering device which is simple to employ with a source of water for providing water, fertilizer, and other waterborne components to the roots of plants below the surface of the soil.

Another object of the present invention is to provide a deep watering device which is sturdy and easily reusable for a long time period.

Another object of the present invention is to provide a deep watering device which is convenient to employ with a typical garden hose.

A further object of the present invention is to provide a deep watering device for plants in which the fittings employed for interconnection between the deep watering device and the standard hose fitting are easily maintained and replaced.

The invention possesses other objects and advantages especially as concerns particular characteristics and features thereof which will become apparent as the specification continues.

For a better understanding of the invention reference is made to the following detailed description of the preferred embodiments of the invention, which should be referenced to the prior described drawings.

DETAILED DESCRIPTION OF THE PREFERRED EMBODIMENT THE INVENTION

Various aspects of the present invention will evolve from the following detailed description of the preferred embodiments thereof which should be referenced to the hereinabove described drawings.

Figure 3:
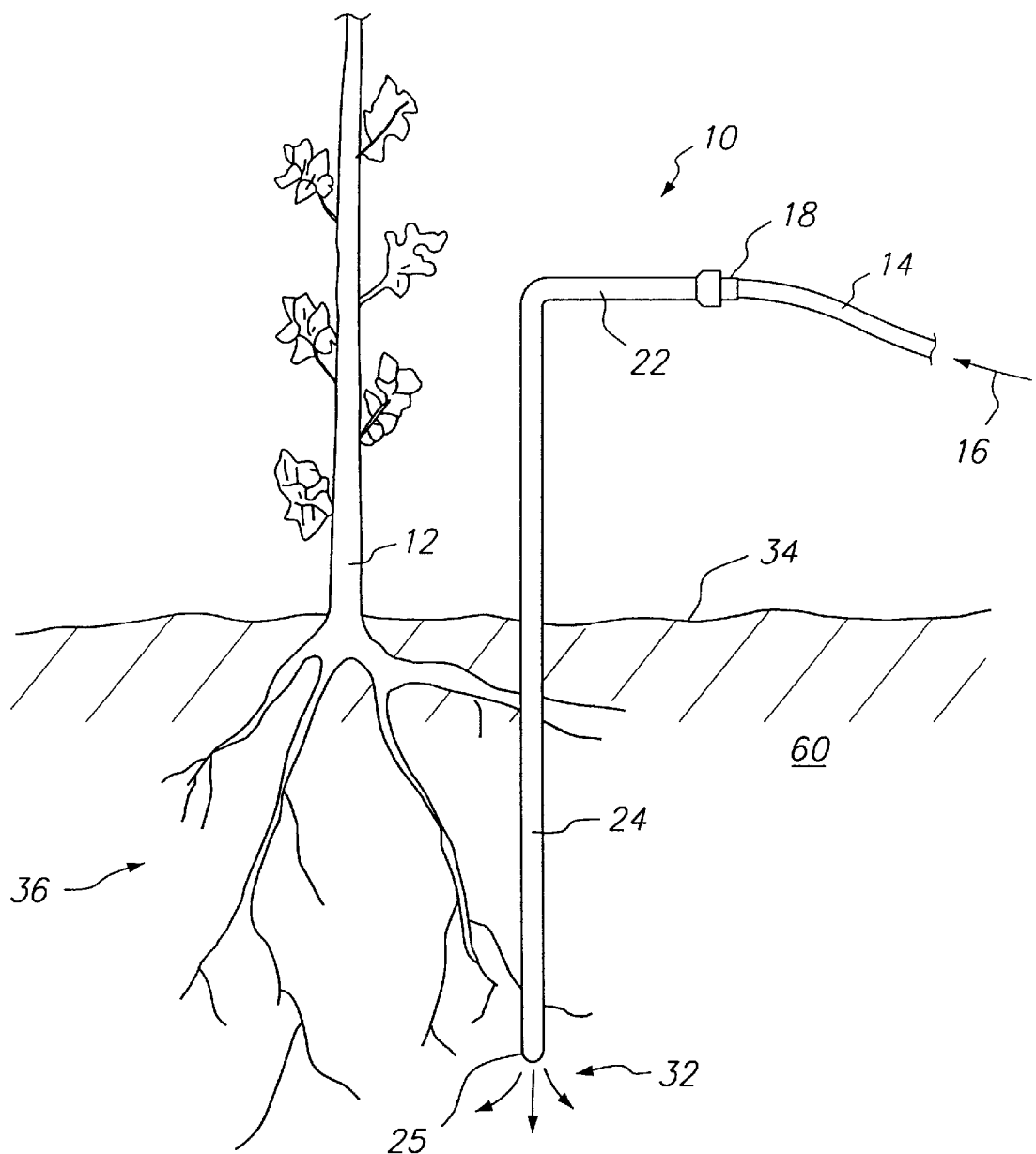
FIG. 3 a side elevational view of the device of the present invention in use.

The invention as a whole is shown in the drawings by reference character 10. The watering device 10 is intended to deliver water to a plant such as a tree, shrub, crop, and the like. As shown in FIG. 3, tree 12 is illustrated as being watered by device 10. Water is derived from a water source (not shown) and passed through a flexible conduit 14 such as a rubber or plastic hose. Directional arrow 16 indicates the flow of water from the source. As such, conduit 14 includes a threaded fitting 18 of conventional configuration. As depicted in FIG. 3, threaded fitting 18 of flexible conduit 14 is a male threaded fitting.

Figure 1:
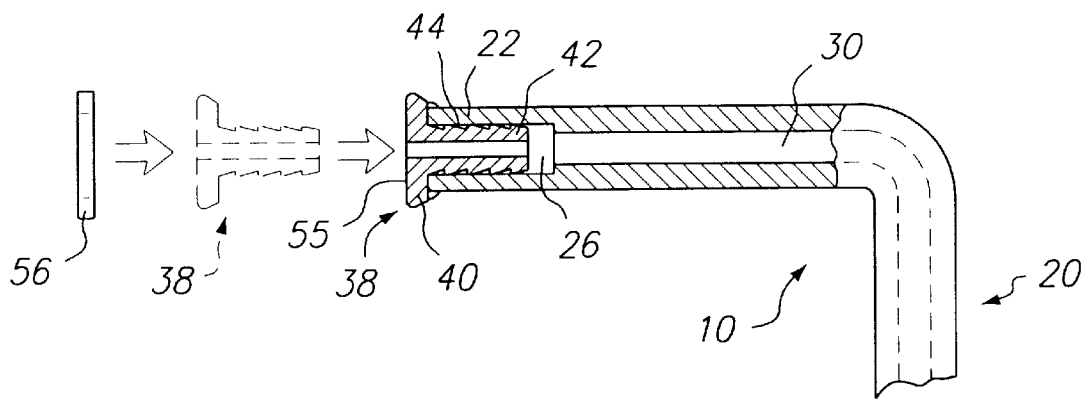
FIG. 1 a side elevational view of the device of the present invention depicting certain components in an exploded configuration.

With reference now to FIG. 1, it may be observed that watering device 10 includes an elongated conduit 20 having a first portion 22 and a second portion 24. Second portion 24 is angularly disposed relative to first portion 22 of elongated conduit 20. First portion 22 of elongated conduit 20 is provided with an aperture 26, while second portion 24 of elongated conduit 20 includes an aperture 28. Water moving according to directional arrow 16, is intended to pass through aperture 26, through door 30 of conduit 20, and outwardly from aperture 28, directional arrows 32, FIG. 3. As may be seen, second portion 24 of elongated conduit 20 has been positioned below ground surface 34 to water the root system 36 of tree 12. Second portion 24 of elongated conduit 20 includes a conical end 25.

Returning to FIGS. 1 and 2, it may be observed that a fitting 38 is employed in system 10 of the present invention. Fitting 38 includes a flange 40 and shelf 41 and a nipple 42. Nipple 42 includes a serrated surface 44, which allows one to friction fit nipple 42 within-conduit 22. As depicted in the drawings, fitting 38 and conduit 20 are of metallic material. Weld seam 45 connects fitting 38 to conduit 20. Needless to say, fitting 38 includes a passage 46, which is contiguous with bore 30 and aperture 26 of conduit 20.

Figure 2:
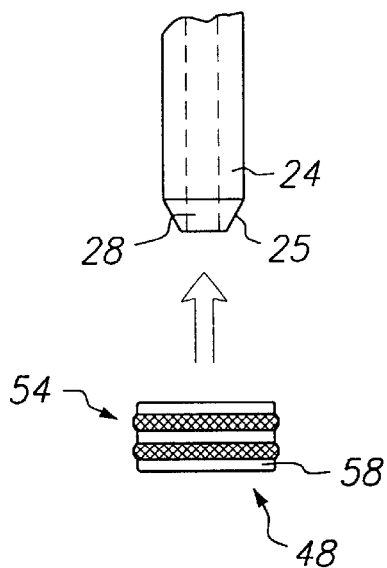
FIG. 2 a partial sectional view of the device of the present invention assembled at the first end portion of the conduit.
Figure 2:
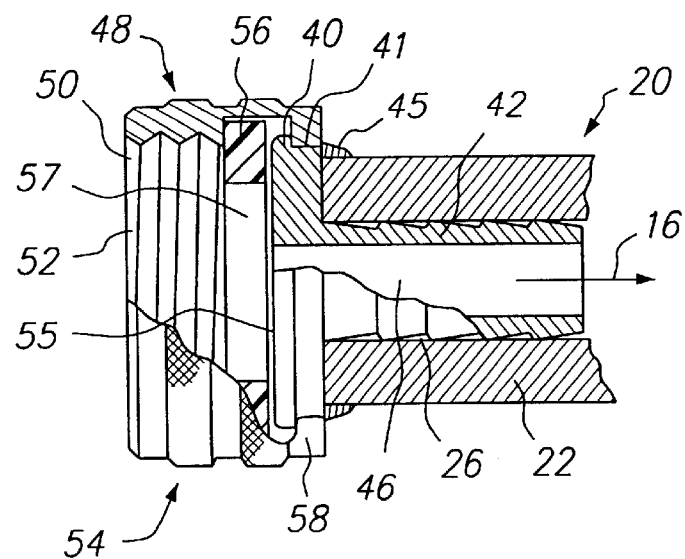

Rotatable member 48 is also employed in the present invention. Rotatable member includes an internally threaded portion 50, which surrounds opening 52. Internally threaded portion 50 is capable of engaging threaded fitting 18 of flexible conduit 14. Knurled ridges 54 permit the user to easily grip rotatable member 48. Washer 56, of elastomeric construction is also employed in the present device and is placed adjacent face 58 of fitting 38. Washer 56 includes an opening 57, which aligns with opening 52 of rotatable member 48 and passage 46 of fitting 38. Rotatable member 48 is passed into place over second portion 24 of conduit 20. Ridge or lip 58 of rotatable member 48 engages flange 40 of fitting 38 when in place. Thus, as shown in FIG. 2, washer 56 interposes flange 40 of fitting 38 and a portion of rotatable member 48, when device 10 is assembled as shown in FIGS. 2 and 3.

In operation, device 10 is assembled by inserting fitting 38 into aperture 26 of first portion 22 of elongated conduit 20. Fitting 38 is then fixed in place by weld seam 45. Washer 56 is then placed against face 55 of fitting 38 and rotatable member 48 is slipped over second portion 24 of conduit 20 such that ridge 58 of rotatable member 48 engages flange 40 atop shelf 41 of fitting 38, best shown in FIG. 2. At this point, washer 56 serves to seal against water leakage between rotatable member 48 and fitting 38, when rotatable member 48 is connected to threaded fitting 18 of flexible conduit 14, and allows the easy turning of rotatable member 48. That is to say, internally threaded portion 50 of rotatable ber 48 engages threaded portion 18 as shown in FIG. 3. Water or tilizer and water then passes through flexible conduit 14, ectional arrow 16, and follows a course through opening 52 of atable member 48, opening 57 of washer 56, passage 46 of fitting and aperture 26 of conduit 20. From this point, water travels ough bore 30 and out through aperture 28 of conduit 20 and into soil 60 below ground surface 34 in order to water roots system of tree 12, FIG. 3.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A watering device connectable to a threaded fitting leading to a source of water, comprising:
   a. an elongated conduit, said elongated conduit a first portion having a first aperture and a second portion having a second aperture, said elongated conduit having an exterior surface;
   b. a nipple fitting snugly within said first aperture of said first portion of said elongated conduit, said nipple connected to a flange extending from a shelf, said shelf located outwardly from said elongated conduit exterior surface, said nipple further including a bore therethrough;
   c. means for welding said nipple to the exterior surface of said elongated conduit; and
   d. a rotatable member, said rotatable member including a bore therethrough, said rotatable member bore fitting over said elongated conduit first and second portions, said rotatable member further including a lip, said lip engaging said flange, said rotatable member further including a threaded portion threadingly engaging the threaded fitting leading to a source of water.

2. The watering device of claim 1 which additionally comprises a washer, said flange interposed said lip of said rotatable member and said washer.

3. The watering device of claim 2 in which said washer is constructed of elastomeric material.

4. The watering device of claim 3 in which said second portion of said elongated conduit includes a ground penetrating tip.

5. The watering device of claim 4 in which said first portion of said elongated conduit is angularly connected to said second portion of said elongated conduit.

* * * * *